3,236,384
APPARATUS FOR FLOCCULATION AND CLARIFICATION OF LIQUIDS
Heinrich Sontheimer, Falkenstein, Taunus, and Hans Weiss, Offenbach (Main), Germany, assignors, by mesne assignments, to Fuller Company, Catasauqua, Pa., a corporation of Delaware
Filed Sept. 18, 1961, Ser. No. 138,724
1 Claim. (Cl. 210—197)

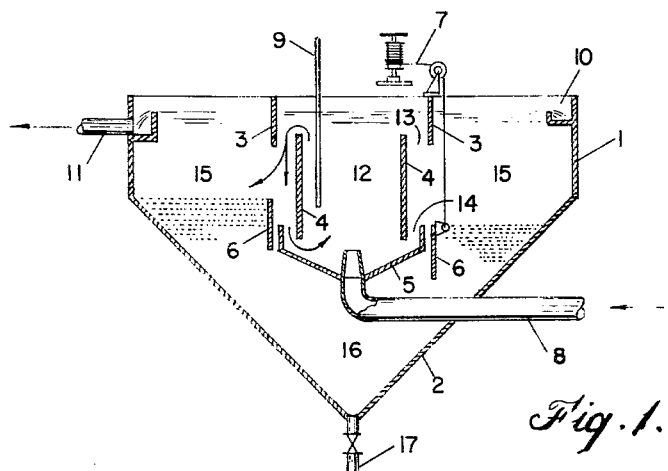
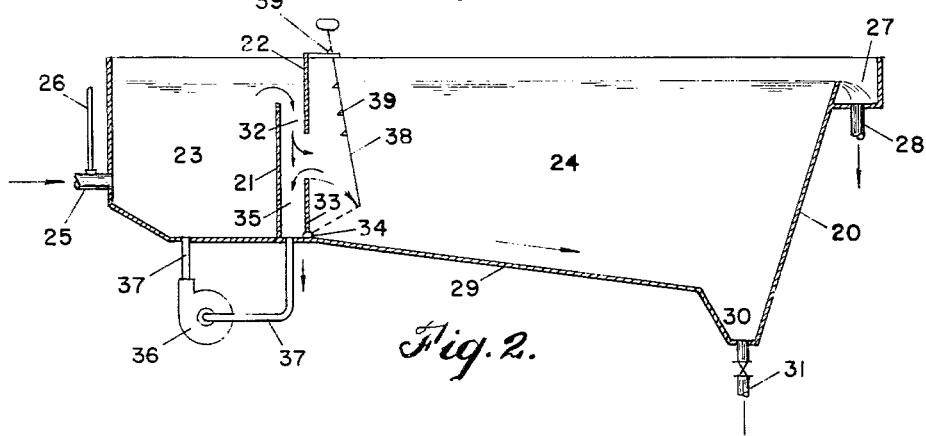
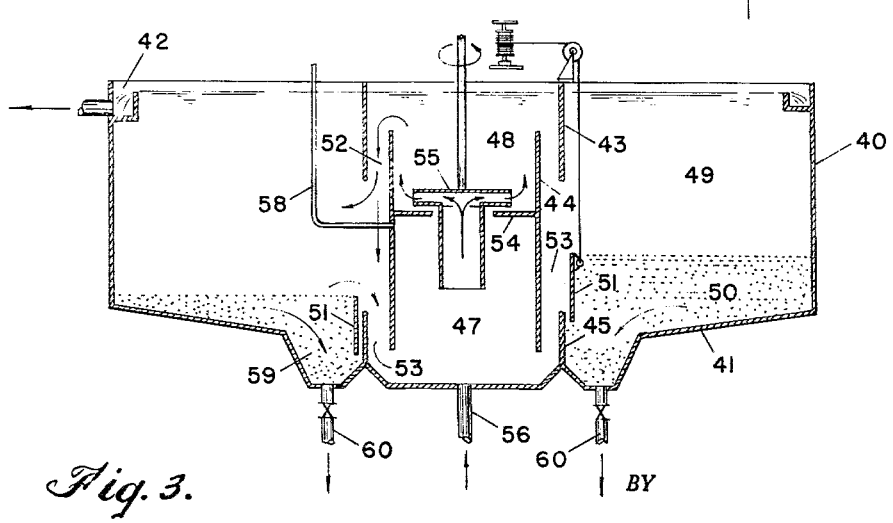

This invention relates to an apparatus for the purification and clarification of solids containing liquids, for example water or waste water, by flocculation and clarification. More particularly the invention relates to an apparatus of this general type, wherein means are provided for recirculation of sludge separating from the liquid in the clarification zone or chamber to the flocculation zone or chamber.

In such an apparatus the sludge content of the flocculation zone should be kept constant and the sludge returned to the flocculation zone should be one that is in the process of subsiding but is not fully settled and thickened. It is also important for the economics of such an apparatus that the sludge withdrawn from the apparatus be highly concentrated.

It is, therefore, an object of this invention to provide an apparatus for flocculation and clarification of solids containing liquids utilizing sludge recirculation from the clarification zone to the flocculation zone, wherein means are provided to maintain the solids content of the flocculation zone constant.

Another object is to provide in an apparatus of this general type means for controlling the concentration of the sludge returned to the flocculation zone.

Another object is to provide an apparatus of the type described with a sludge thickening zone of variable volume which permits maximum thickening of sludge for withdrawal from the apparatus and return to the flocculation zone of a sludge of the proper consistency despite varying conditions of accrual of new sludge and of the thickening quality of the sludge.

Other objects of the invention will become apparent upon consideration of the detailed description and the claim which follows.

It is known to treat liquids, such as water or waste water, for purification and clarification in one or more flocculation zones or chambers with chemicals, e.g. precipitants, flocculants and flocculation aids. To enhance the flocculation by presenting a large surface of the finely divided suspended solids, and thereby improve the quality of the treated water, the precipitate is concentrated by circulating a portion thereof in the flocculation zone or chamber.

It is also known to subdivide clarification basins by means of suitable partitions into chambers for flocculation, clarification of the flocculated water and thickening of the settled products of flocculation and precipitation. Underneath the clarification chamber there is usually a thickening chamber, wherein the precipitate settling out of the clarification zone is thickened to a sludge of as high a concentration as possible. Some sludge settling in the clarification chamber is returned to the flocculation chamber, to attain the concentration of the precipitate mentioned above. For this purpose, the thickening chamber usually is separated from the flocculation chamber by a wall, whose uper edge establishes the horizontal boundary plane between the thickening chamber and the clarification chamber, sludge from above this plane overflowing the upper edge of the wall and returning to the flocculation chamber. Sometimes thickened sludge is returned to the flocculation zone by pumps. In such case, the thickened sludge is diluted in the flocculation zone to the sludge concentration desired in said zone, which is substantially lower than that of the fully concentrated sludge. This pumping of thickened sludge has been found unsatisfactory, since concentrated and aged sludge is by far less suitable for a flocculation process than a sludge which has not been fully settled.

In operation of such plants the thickening zone often is kept filled with sludge to such an extent, that it can receive only a part of the sludge subsiding from the clarification zone, the other part being forced to return to the flocculation zone. This manner of operation, wherein the volume of the thickening chamber and therefore also the volume of sludge in the water treating plant is maintained constant, has been found to be too rigid, because the precipitate accruing in the plant is not formed in equal quantities per units of time and the thickening quality of the sludges is not always the same. It has been found that with constant volume of the thickening chamber and constant sludge withdrawal from the thickening chamber, a constant sludge content cannot be maintained in the flocculation chamber. At times of high sludge formation relatively much sludge returns from the sludge thickening chamber to the flocculation chamber. At times of low sludge formation the sludge return may be interrupted.

Furthermore, it has been found in the operation of water treating plants, that it may be desirable sometimes to keep the sludge volume contained in the plant at a minimum value, so that the sludge remains in the plant only a short time.

In accordance with the invention, the processes described above can be carried out in a much more efficient manner, by providing means whereby the sludge volume of the thickening chamber, and thereby also the entire sludge volume contained in the plant, is adjustably variable. The invention relates to an apparatus for treating liquids, such as water and waste water, with flocculants in the presence of previously flocculated material, comprising a basin which is separated by means of suitable partitions into one or more flocculation zones or chambers and a clarification zone or chamber with an underlying thickening zone or chamber in such manner, that a portion of the sludge accruing by sedimentation in the clarification zone and subsiding into the thickening zone can be returned to the flocculation zone, while thickened sludge is withdrawn continuously or intermittently from a lower portion of the thickening zone. The apparatus is characterized by means for varying the elevation of the boundary between the clarification chamber and the thickening chamber, so that the comparative volumes of these two chambers can be changed as required.

The boundary between clarification chamber and thickening chamber is at the elevation of the sludge surface which is formed by sedimentation of the sludge particles out of the clarification chamber, and is established by the overflow edge of the wall separating the thickening chamber from the flocculation chamber. By adjusting the height of this overflow edge, the quantity and consistency of the sludge returning to the flocculation chamber can be varied, and, in cooperation with the sludge withdrawal, the volume and consistency of the thickened sludge can be influenced, so that the plant can be adjusted to all operating conditions.

For carrying out the process according to the invention, basins of various shapes, such as round, square or rectangular can be used. In round basis the flocculation chamber is arranged in the center and the clarification chamber in the outer region, with the thickening chamber underlying the clarification chamber. With such an arrangement the thickening chamber is separated from the flocculation chamber by an annular partition. According to the invention a second annular partition, for example of sheet iron, is mounted a small distance from and surrounds the first annular partition. This second annular partition is adjustable as to height and can be fixed with its upper edge at various elevations. Instead of a second partition and adjustable weir could be mounted on the first annular partition. In this manner the sludge surface in the thickening chamber can be regulated, particularly with readily flowable sludges.

The invention will be more readily understood by consideration of the drawings wherein several flocculation and clarification basins according to the invention are shown diagrammatically in vertical section.

FIGURE 1 shows an apparatus according to the invention utilizing a round basin with conical bottom.

FIGURE 2 shows an apparatus according to the invention utilizing a longitudinal basin.

FIGURE 3 shows the invention applied in a round basin with mechanically induced circulation.

The basin according to FIGURE 1 comprises a cylindrical wall 1 and a conical bottom 2. Partitions 3, 4 and 5 are mounted in the basin and may be supported in known manner from the bottom 2. The raw water is introduced from below through a conduit 8 into the space surrounded by the partitions. Chemicals used in the treatment may be introduced through a chemical inlet line 9. The clarified water is withdrawn in known manner from a peripheral launder 10 through an effluent conduit 11. Accumulating excess sludge is withdrawn through a valved waste conduit 17.

The partitions 3, 4 and 5 are circular in cross section and are arranged concentrically in the basin. The upper partition 3 is a tube having its upper end extending to a level above the liquid surface, and its lower end below the upper edge of the intermediate partition 4. Intermediate partition 4 also is a tube whose upper end is below the liquid level. Its lower end extends to below the upper edge of the lower partition 5, which surrounds the raw water inlet like a funnel.

These three partitions delimitate the flocculation chamber 12 and form passageways 13 and 14 which connect the flocculation chamber 12 with the clarification chamber 15 and the thickening chamber 16. According to the invention the lower partition 5 is surrounded by an annular, vertically adjustable partition or wall 6, whose upper edge determines the level of the sludge surface. The wall 6 can be raised or lowered by any suitable means, such as a combination 7 of a winch, cable and a pulley affixed to the upper edge of upper partition 3, so that the overflow edge is at different elevations. In this manner the relative volumes of the clarification chamber 15 and the thickening chamber 16 can be varied and the quantity and concentration of settled sludge returning to the flocculation chamber be controlled.

In FIGURE 1 the wall 6 is shown at the right side in a lowered position and at the left side in a raised position. With the wall 6 in raised position the volume of the thickening chamber 16 is increased at the expense of that of the clarification chamber 15, and vice versa, when the wall 6 is in lowered position, the boundary between the thickening chamber and the clarification chamber is at a lower elevation and the volume of the thickening chamber is reduced.

The elongated flocculation and clarification basin 20 according to FIGURE 2 is divided in known manner into a fluocculation chamber 23 and a clarification chamber 24 by partition 21 extending from the basin bottom to an intermediate elevation below the liquid surface, and partition 22 arranged in the clarification chamber a small distance from the partition 21 and extending from an elevation above the liquid level, for example from the top of the basin, downwardly into the liquid to an elevation below the upper edge of partition 21. The raw water inlet conduit 25 discharges through the vertical end wall of the basin into the flocculation chamber 23. Chemicals may be introduced into the flocculation chamber 23 directly, or, as shown, through a chemical line 26 discharging to the raw water conduit 25. A launder 27 is provided at the slanted end wall in the clarification chamber 24 and an effluent conduit 28 leads therefrom.

The bottom 29 of the basin slopes downwardly toward a sludge sump 30 from which leads a valved sludge withdrawal conduit 31. The partitions 21 and 22 form a passageway 32 between the flocculation chamber 23 and the clarification chamber 24. Through this passageway the solids formed in flocculation chamber 23 enter the clarification chamber with the stream of liquid under treatment and settle therein to the bottom, where they form a sludge layer which increases in concentration in the direction of the sludge sump.

According to the invention a further partition or wall 33 is mounted in the clarification chamber a small distance from the partition 21, for example opposite partition 22. Between partition 21 and wall 33 a sludge chamber 35 is formed, from which a sludge suspension concentrated by sedimentation to a suitable degree can be returned to the flocculation chamber by means of a pump 36 and a conduit 37. This sludge suspension includes solids depositing in chamber 35 as they pass over it on their way to the clarification chamber, and some of the sludge settled in the clarification chamber which flows over the upper edge of wall 33 into the sludge chamber.

The wall 33 is rotatable about an axis 34 lying on the bottom of the basin. By lowering the wall 33 in the direction of the arrow the sludge collection space can be made lower and wider. The adjustment can be made from the upper edge of the basin by any suitable means, such as rods 38. These rods are provided with stops 39, whereby it is possible to hold the wall 33 in different positions, one of which is indicated in dotted lines in FIGURE 2. The upper edge of wall 33 determines the level of the surface of the sludge which forms in the lower portion of the clarification zone, below which the thickening of the sludge takes place. Furthermore, by increasing the inclination of the wall 33 toward the bottom of the basin, the sludge return to the flocculation zone is increased. By varying the angle of inclination of wall 33 and the capacity of pump 36 the operation can be regulated to optical conditions despite varying inflow conditions.

The apparatus according to FIGURE 3 comprises a round basin with a cylindrical wall 40, a flat or slightly conical bottom 41 and a clarified liquid overflow 42. The basin is divided, in similar manner as described in connection with FIGURE 1, by means of concentric partitions 43, 44 and 45, so that a primary flocculation chamber 47 and a secondary flocculation chamber 48 are separated from an outer clarification chamber 49 and a thickening chamber 50 below chamber 49.

The upper partition 43 is a tube which extends from an elevation above the liquid surface, for example from the top of the basin downward into the liquid. The lower partition 45 has the same diameter and extends upward from the bottom of the basin. The inner partition 44 comprises a tube with a smaller diameter than partitions 43 and 45. The upper end of partition 44 is at a higher elevation than the lower end of partition 43 and its lower end is at a lower elevation than the upper edge of lower partition 45.

In accordance with the invention, partition 45 is surrounded by an annular, vertically adjustable partition or wall 51 whose upper edge forms the overflow for sludge returning to the primary flocculation chamber 47.

The partitions form passageways 52 and 53 between the secondary flocculation chamber 48 and the clarification chamber 49, and between the thickening chamber 50 and the primary flocculation chamber 47, respectively. Between the primary and secondary flocculation chambers an annular plate 54 is provided which constricts the cross section of the flow. In its opening a rotor 55 is mounted.

Raising and lowering of wall 51 may be effected from a bridge, or the like, extending over the basin, which may also support the other partitions and the rotor 55 with its drive. The means for adjusting the position of wall 51 shown in FIGURE 3, are the same as those described in connection with FIGURE 1, but any other suitable means can be used therefor. On the right side of FIGURE 3 the wall 51 is shown in a raised position, and on the left side in a lowered position, with its overflow edge only slightly above the upper edge of partition 45.

The raw water is introduced through a conduit 56 into the primary flocculation chamber 47 from below, and chemicals, such as flocculants, may be introduced through a line 58. Thickened sludge is withdrawn intermittently or continuously from collecting channels 59 through conduits 60.

In operation, the raw water entering chamber 47 is mixed therein by rotor 55 with liquid and solids suspension present therein and if necessary with flocculants or other reagents. The mixture is pumped by the rotor 55 through the secondary flocculation chamber 48 and the upper passageway 52 into the clarification chamber 49. The rotor pumps a quantity of liquid which is larger than the quantity of the incoming liquid (per unit of time). In the clarification chamber a quantity of clarified water corresponding to that of the incoming raw liquid separates and is withdrawn over overflow 42. The remaining pumped liquid returns, enriched by flocs, through the lower passageway 53 to the primary flocculation chamber 47. From this circulation of the suspension flocs separate in the clarification chamber by sedimentation and descend to the thickening chamber. By adjusting the elevation of wall 51, whose upper edge determines the boundary between the clarification chamber and the thickening chamber, the thickening chamber can be reduced in size in favor of the clarification chamber, or be enlarged at the expense of the clarification chamber. Thus the sludge volume which is thickened as well as the quantity and concentration of the floc suspension returning from the clarification chamber to the primary flocculation chamber are varied as required to obtain a constant volume of proper concentration in the flocculation chambers and maximum sludge thickening in the thickening chamber.

The following example shows the importance of the invention in the operation of flocculation and clarification plants.

*Example*

A water is treated with chemical and flocculation aids in an apparatus according to FIGURE 3. The water enters first the primary flocculation chamber, where it is dosed with the chemicals and mixed with the precipitate present. Due to the beginning flocculation reaction, 300 to 700 mg., a mean of 500 mg. newly flocculated solids are formed per liter of water treated.

These are pumped together with the water into the secondary flocculation chamber by the rotor which is arranged between the two flocculation chambers. This rotor pumps more liquid than is added to the primary flocculation chamber. This causes a circulation which leads from the secondary flocculation chamber past the clarification chamber to the primary flocculation chamber. The treated water separates dynamically from this circulation and leaves the clarification chamber over the overflow 42. The flocculation products settle and thicken in the thickening chamber. The sludge concentration at the surface of the thickening chamber is about 5000 mg. solids per liter. It increases in the thickening chamber in downward direction and reaches at the level where the sludge is withdrawn a concentration of 20,000 mg. solids per liter. Due to the sludge formation varying in time, the quality of the treated water was unsatisfactory. By varying the elevation of the overflow edge for the sludge returning from the thickening chamber to the primary flocculation chamber, it was possible to maintain in the flocculation chambers a substantially constant solids content of from 3,000 to 4,000 mg./.l, which resulted in a uniformly good clarified water quality.

We claim:

In an apparatus for flocculation and clarification of liquids, said apparatus including a substantially round basin having a bottom and an upstanding wall, means for introducing liquid to be treated into said basin, means for maintaining a predetermined liquid level in said basin and for withdrawing treated liquid therefrom, in a clarification zone occupying the outer upper zone of the basin, a thickening zone subjacent the clarification zone in the lower portion of said basin, first partition means concentrically located within said basin and forming a flocculation chamber in the space within said partition means, the top edge of said first partition means being below the liquid level at an elevation corresponding to the clarification zone and the bottom edge of said first partition means being above the basin floor at an elevation corresponding to the thickening zone, second partition means concentric with and larger than said first partition means and forming therewith a first annular passageway from the flocculation chamber to the clarification zone, said second partition means extending above the liquid level, the lower edge of said second partition means being spaced below the upper edge of said first partition means, third continuous and imperforate partition means extending upward from the basin floor and being concentric with and larger than said first partition means and spaced therefrom to form therewith a second second annular passageway from the thickening zone to the flocculation chamber, the upper edge of said third partition means extending above the bottom edge of said first partition means, mixing means in said flocculation chamber, means for withdrawing thickened sludge from said thickening zone, the improvement comprising a continuous and imperforate wall spaced from and completely surrounding said third partition means, said imperforate wall having an overflow edge which forms an overflow for sludge returning from the thickening zone to the flocculation chamber through the second annular passageway, and means for raising and lowering said imperforate wall, whereby the elevation of the boundary between the clarification and thickening zones may be varied.

References Cited by the Examiner

UNITED STATES PATENTS

| | | | |
|---|---|---|---|
| 2,378,799 | 6/1945 | Sebald | 210—197 |
| 2,678,914 | 5/1954 | Kalinske | 210—221 |
| 2,678,916 | 5/1954 | Kalinske | 210—201 |

REUBEN FRIEDMAN, *Primary Examiner.*

HERBERT L. MARTIN, CHARLES SUKALO,
*Examiners.*